(12) United States Patent
Yamashita et al.

(10) Patent No.: US 8,340,650 B2
(45) Date of Patent: Dec. 25, 2012

(54) MOBILE PHONE DEVICE, AND ITS CHANNEL SEARCH METHOD AND PROGRAM

(75) Inventors: Hajime Yamashita, Tokyo (JP); Kazuki Atsuta, Tokyo (JP)

(73) Assignee: NEC Corporation, Tokyo (JP)

( * ) Notice: Subject to any disclaimer, the term of this patent is extended or adjusted under 35 U.S.C. 154(b) by 253 days.

(21) Appl. No.: 12/669,283

(22) PCT Filed: Jul. 11, 2008

(86) PCT No.: PCT/JP2008/062551
§ 371 (c)(1),
(2), (4) Date: Jan. 15, 2010

(87) PCT Pub. No.: WO2009/011299
PCT Pub. Date: Jan. 22, 2009

(65) Prior Publication Data
US 2010/0203877 A1    Aug. 12, 2010

(30) Foreign Application Priority Data

Jul. 18, 2007   (JP) .................................. 2007-187118

(51) Int. Cl.
*H04M 3/00*    (2006.01)
*H04W 72/00*   (2009.01)
*H04B 7/216*   (2006.01)
(52) U.S. Cl. .......................... 455/418; 455/450; 370/320
(58) Field of Classification Search ................... 455/418
See application file for complete search history.

(56) References Cited

U.S. PATENT DOCUMENTS

| 2003/0148766 A1* | 8/2003 | Inoguchi et al. ............... 455/450 |
| 2008/0186904 A1* | 8/2008 | Koyama et al. ............... 370/320 |

FOREIGN PATENT DOCUMENTS

| JP | 02-216924 A | 8/1990 |
| JP | 06-351058 A | 12/1994 |
| JP | 07-107550 A | 4/1995 |
| JP | 2000-152305 A | 5/2000 |
| JP | 2000-333242 A | 11/2000 |
| JP | 2001-128241 A | 5/2001 |
| JP | 2001128241 A * | 5/2001 |
| JP | 2003-244066 A | 8/2003 |
| JP | 2004015732 A | 1/2004 |
| JP | 2006180378 A | 7/2006 |

OTHER PUBLICATIONS

International Search Report for PCT/JP2008/062551 mailed Oct. 7, 2008.
Japanese Office Action for JP2007-187118 mailed on Sep. 18, 2012.

* cited by examiner

*Primary Examiner* — Wayne Cai
*Assistant Examiner* — Timothy Pham

(57) ABSTRACT

To provide a mobile phone device, and its channel search method and program capable of starting up a channel search without requiring a user to manipulate any channel search button, and of returning from out-of-service-range or waiting in the optimal channel. A mobile phone device includes an acceleration sensor that detects an amount of vibration exerted on the mobile phone device, and the control means compares an amount of vibration detected by the acceleration sensor with a predetermined first threshold, and when the amount of vibration is higher than or equal to the first threshold, starts electric field level measurement of a waiting channel or a call channel as a channel search.

10 Claims, 4 Drawing Sheets

SHAKE UP AND DOWN

MOBILE PHONE DEVICE, AND ITS CHANNEL SEARCH METHOD AND PROGRAM

This application is the National Phase of PCT/JP2008/062551 filed on Jul. 11, 2008, which is based upon and claims the benefit of priority from Japanese patent application No. 2007-187118, filed on Jul. 18, 2007, the disclosure of which is incorporated herein in its entirety by reference.

TECHNICAL FIELD

The present invention relates to a mobile phone device, and its channel search method and program.

BACKGROUND ART

In waiting operations including out-of-service waiting operations of mobile phone devices, the level measurement for channels in the vicinity is started up only at predetermined intervals in order to reduce consumption current, and therefore there is a possibility that the waiting is not being performed in the optimal channel. As countermeasures against this problem, a channel search button that is manually manipulated by a user itself to facilitate return from an out-of-service range is in existence (for example, see Patent document 1).

[Patent Document 1]
Japanese Unexamined Patent Application Publication No. 2000-333242

DISCLOSURE OF INVENTION

Technical Problem

FIG. 6 shows a configuration of a mobile phone device including the above-mentioned channel search button. As shown in FIG. 6, the mobile phone device 1 is equipped with a channel search button 7. When a user is in an out-of-service waiting or feels that waiting sensitivity is poor, the user manually manipulates this channel search button 7 such as being pressed down. By using this user manipulation as a trigger, a channel search is started up. However, in the mobile phone device 1 having the configuration shown in FIG. 6, the user needs to press down the channel search button 7 deliberately in order to return from the out-of-service range or to wait in the optimal channel, and thus they are inconvenient in terms of usability.

The present invention has been made in view of the above-mentioned circumstances, and an object of the present invention is to provide a mobile phone device, and its channel search method and program capable of starting up a channel search without requiring a user to manipulate any channel search button.

Technical Solution

To achieve the object, a mobile phone device according to the present invention includes control means that performs control so as to start a channel search by using a predetermined amount of vibration exerted on the mobile phone device as a trigger.

A channel search method for a mobile phone device according to the present invention includes: a step of detecting an amount of vibration exerted on the mobile phone device; a step of comparing the amount of vibration with a predetermined first threshold; and a step of, when the amount of vibration is higher than or equal to the first threshold, starting electric field level measurement of a waiting channel or a call channel as a channel search.

A program according to the present invention causes a computer to execute: a process for detecting an amount of vibration exerted on the mobile phone device; a process for comparing the amount of vibration with a predetermined first threshold; and a process for, when the amount of vibration is higher than or equal to the first threshold, starting electric field level measurement of a waiting channel or a call channel as a channel search.

Advantageous Effects

According to the present invention, a user can start up a channel search by just intuitively shaking a mobile phone device.

BEST MODE FOR CARRYING OUT THE INVENTION

Best modes for carrying out the present invention are explained hereinafter in detail with reference to the accompanying drawings.

FIG. 1 shows a configuration of a mobile phone device according to an exemplary embodiment of the present invention.

The mobile phone device 1 includes a transmitting/receiving antenna 2 and a radio unit 3, both of which are used to communicate with a base station, a display unit 4 that displays an electric field level such as displaying an antenna bar, a control unit 5 that controls the whole mobile phone device 1, and an acceleration sensor 6 that detects a vibrating motion of the mobile phone device 1.

As operation examples of the mobile phone device 1 configured in a manner described above, first and second exemplary embodiments are respectively explained hereinafter. In the mobile phone device 1, a program that causes the mobile phone device 1 to execute a channel search (hereinafter, simply called "program") is read from a predetermined recording medium (storage medium) or through a predetermined (wired/wireless) communication into the control unit 5, and controls the operations of the control unit 5. The control unit 5 performs operations of the first and second exemplary embodiments described below under the control of this program.

Operations during out-of-service waiting are explained as the first exemplary embodiment of the present invention with reference to a flowchart shown in FIG. 3.

When the mobile phone device 1 is in an out-of-service waiting state, the control unit 5 displays text such as "out of service", instead of the antenna bar indicating the current electric field level, in the display unit 4 (step S1).

As shown in FIG. 2, a user shakes the mobile phone device 1 up and down and transfers the vibration to the acceleration sensor 6 embedded in the mobile phone device 1 (step S2).

The control unit 5 determines whether or not the amount of the vibration transferred to the acceleration sensor 6 exceeds a threshold (first threshold) that is preliminarily set in the control unit 5 (step S3). When the amount of the vibration is higher than or equal to the threshold (step 3/YES), the control unit 5 proceeds to step S4. When the amount of the vibration is lower than the threshold (step 3/NO), the control unit 5 maintains the waiting in the current channel (return to step S1).

The control unit 5 starts electric field level measurement for waiting channels in a table that is preliminarily set in the control unit 5, or for waiting channels specified through a communication network (step S4).

The control unit 5 compares an in-service threshold (second threshold) that is preliminarily set in the control unit 5 with the electric field level of a waiting channel having the highest electric field level (search channel) among the waiting channels whose electric field levels were measured (step S5). When the electric field level of the search channel is higher than the in-service threshold (step S5/YES), the control unit 5 proceeds to step S6. When the electric field level of the search channel is lower than or equal to the in-service threshold (step S5/NO), the control unit 5 maintains the waiting in the current channel (return to step S1).

The control unit 5 sends out a position registration request (step S6).

The acceptance/denial of the position registration is determined on the communication network side (step S7). When the position registration is accepted (step S7/OK), the control unit 5 proceeds to step S8. When the position registration is not accepted (step S7/NG), the control unit 5 returns to the step S6 and sends out the position registration request in descending order of the electric field level.

The control unit 5 turns off the out-of-service indication in the display unit 4, and displays a current electric field level by using an antenna bar or the like (step S8).

As described above, according to the mobile phone device in this exemplary embodiment, the acceleration sensor provided in the mobile phone device detects a vibrating motion, i.e., up-and-down shaking of the mobile phone device carried out by the user, and the control unit starts a channel search function by using this vibrating motion as a trigger. Therefore, when the user is in out-of-service waiting or feels that waiting sensitivity is poor, the user can start up a channel search by just intuitively shaking the mobile phone device up and down. That is, the user does not need to press down any channel search button deliberately in contrast to the configuration shown in FIG. 6. Therefore, it has an advantageous effect that the user does not feel any inconvenience in terms of usability and can easily return from the out-of-service or wait in the optimal channel.

Operations during a call are explained as the second exemplary embodiment of the present invention with reference to a flowchart shown in FIG. 4 and a conceptual diagram of service areas shown in FIG. 5.

Suppose that while the mobile phone device 1 communicates within the area A 8 of FIG. 5, the quality of the call has deteriorated (step S11).

As shown in FIG. 2, the user shakes the mobile phone device 1 up and down and transfers the vibration to the acceleration sensor 6 embedded in the mobile phone device 1 (step S12).

The control unit 5 determines whether or not the amount of the vibration transferred to the acceleration sensor 6 exceeds a threshold (first threshold) that is preliminarily set in the control unit 5 (step S13). When the amount of the vibration is higher than or equal to the threshold (step 13/YES), the control unit 5 proceeds to step S14. When the amount of the vibration is lower than the threshold (step 13/NO), the control unit 5 maintains the communication through the current call channel (return to step S11).

The control unit 5 starts electric field level measurement for call channels in a table that is set in the control unit 5, or for call channels specified through a communication network (step S14).

The control unit 5 compares the electric field level of the current call channel with the electric field level of a call channel having the highest electric field level (search channel) among the call channels whose electric field levels were measured (step S15). When the electric field level of the search channel is higher than the electric field level of the current call channel (step S15/YES), the control unit 5 proceeds to step S16. When the electric field level of the search channel is lower than or equal to the electric field level of the current call channel (step S15/NO), the control unit 5 maintains the communication through the current call channel (return to step S11).

The control unit 5 sends out a call channel switch request to the communication network side (step S16). For example, the control unit 5 requests the area B 9 of FIG. 5.

The acceptance/denial of the call channel switch is determined on the communication network side (step S17). When the call channel switch is accepted (step S17/OK), the control unit 5 proceeds to step S18. When the call channel switch is not accepted (step S17/NG), the control unit 5 returns to the step S16 and sequentially sends out the switch request in descending order of the level.

The control unit 5 performs the switching of call channels (step S18). For example, the control unit 5 switches over to the area B 9 of FIG. 5.

It reaches an improvement in the call quality (step S19).

As described above, according to the mobile phone device in this exemplary embodiment, the acceleration sensor provided in the mobile phone device detects a vibrating motion, i.e., up-and-down shaking of the mobile phone device carried out by the user, and the control unit starts a channel search function by using this vibrating motion as a trigger. Therefore, when the user feels during a call that the call quality is poor, the user can start up a channel search by just intuitively shaking the mobile phone device up and down. That is, the user does not need to press down any channel search button deliberately in contrast to the configuration shown in FIG. 6. Therefore, it has an advantageous effect that the user does not feel any inconvenience in terms of usability and can easily switch over to the optimal channel even during the call, thereby improving the call quality.

Although exemplary embodiments in accordance with the present invention have been explained so far, the present invention is not limited to the above-described exemplary embodiments and various modifications can be made without departing from its scope and spirit.

For example, the control operations in the above-described first and second exemplary embodiments can be implemented by hardware, software, or combination thereof.

Note that if the process is to be implemented by software, it is possible to install a program having a processing sequence recorded thereon in a memory within a computer embedded in purpose-built hardware and execute it, or install the program in a general-purpose computer capable of executing various processes and execute it.

For example, the program can be recorded in advance in a hard disk drive or a ROM (Read Only Memory) used as a recording medium.

Alternatively, the program can be also temporarily or permanently stored (recorded) in a removable recording medium such as a floppy (registered trademark) disk, a CD-ROM (Compact Disc Read Only Memory), a MO (Magneto optical) disk, a DVD (Digital Versatile Disc), a magnetic disk, and a semiconductor memory.

It is possible to provide a removable recording medium like this as the so-called "packaged software".

Note that in addition to installing the program from a removable recording medium like the one described above into the computer, it can be wirelessly transferred from a download site to the computer, or transferred to the computer in a wired manner through a network such as a LAN (Local Area Network) and the Internet. Further, in the computer, it is possible to receive the transferred program and install it in an internal recording medium such as a hard disk drive.

Further, in addition to executing in a time series in accordance with processing operations explained with the above-described exemplary embodiments, it is also possible to construct so that they are executed in parallel or in an individual manner depending on the processing capacity of an apparatus that executes the process or depending on the necessity.

INDUSTRIAL APPLICABILITY

The present invention is applicable to apparatuses/devices, systems, methods, and programs that search channels suitable for the communication.

EXPLANATION OF REFERENCE

Figure 1:
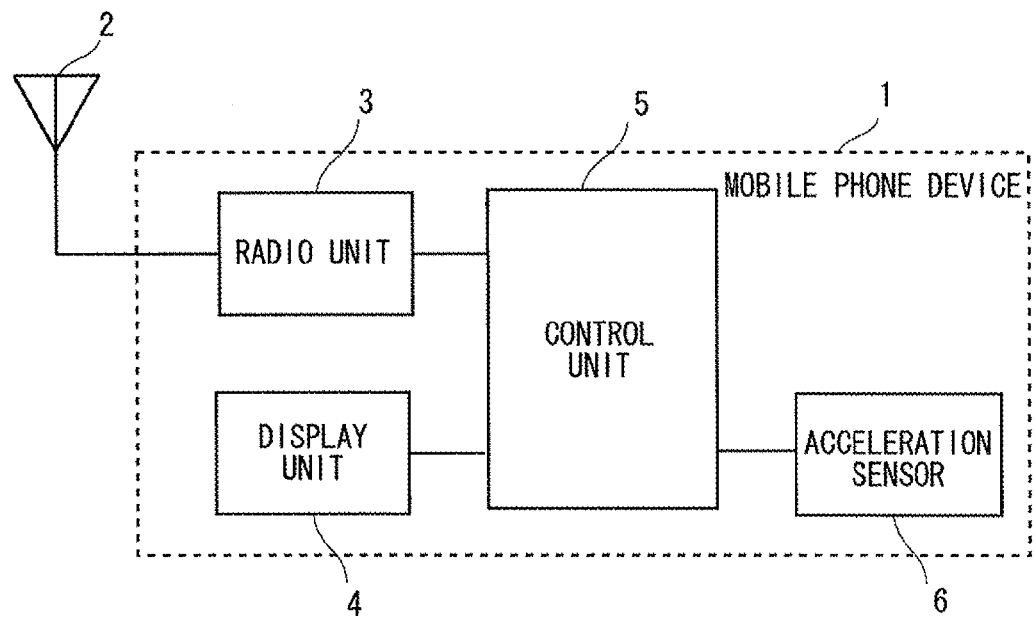
FIG. 1 is a block diagram illustrating a configuration of a substantial part of a mobile phone device according to an exemplary embodiment of the present invention.
Figure 2:
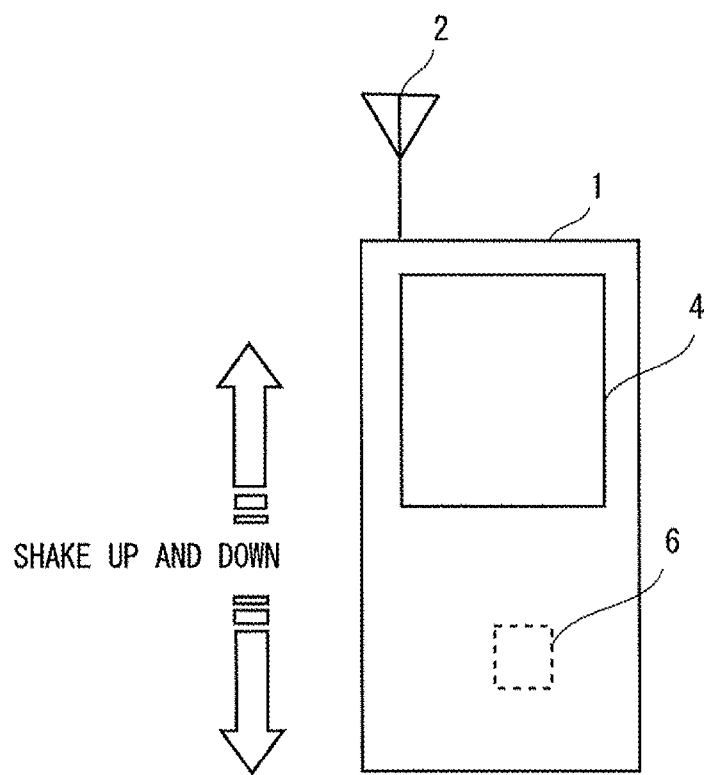
FIG. 2 shows an external front view of a mobile phone device according to an exemplary embodiment of the present invention.
Figure 3:
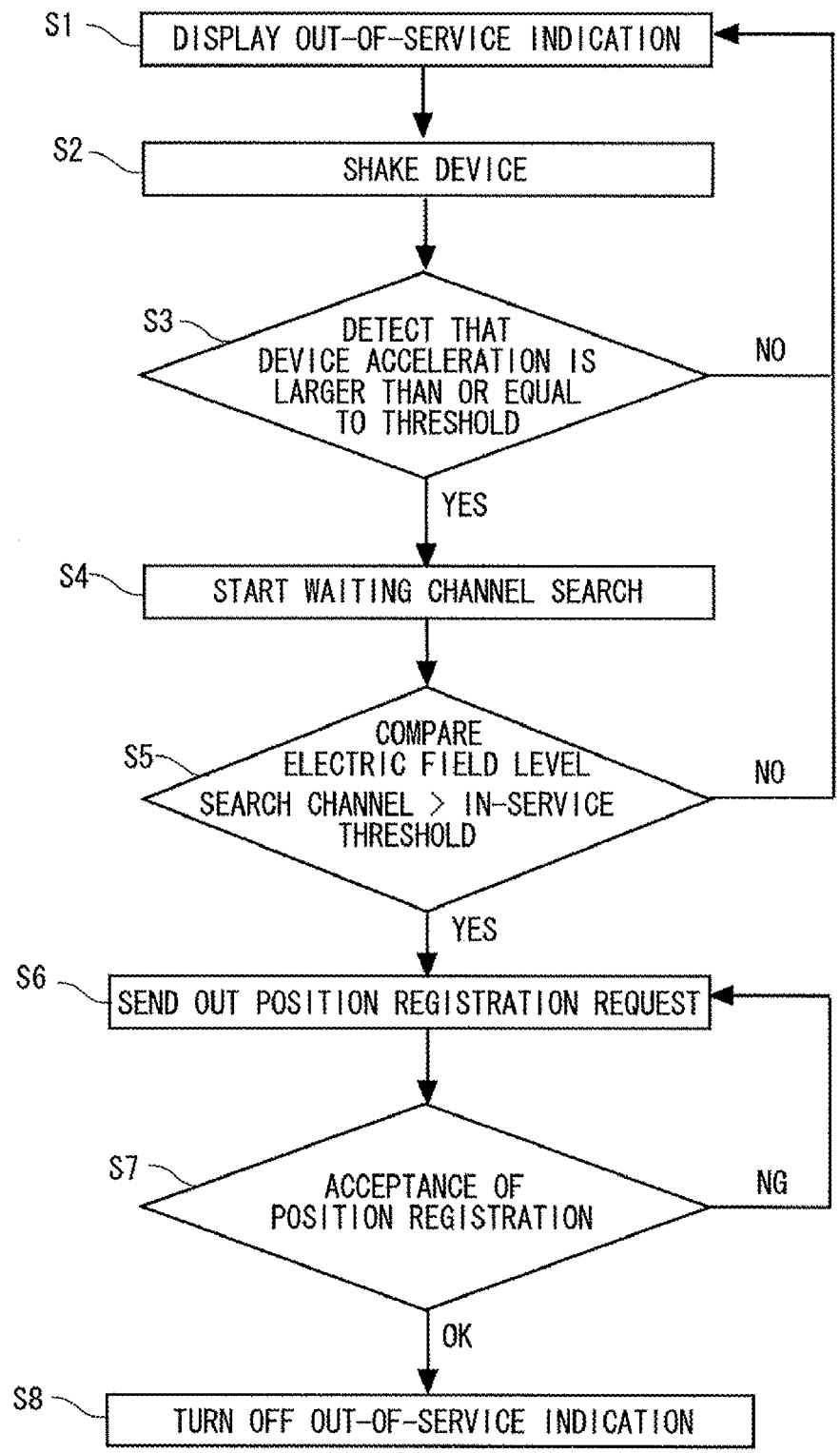
FIG. 3 is a flowchart showing an operation example when a mobile phone device according to an exemplary embodiment of the present invention is in a waiting state.
Figure 4:
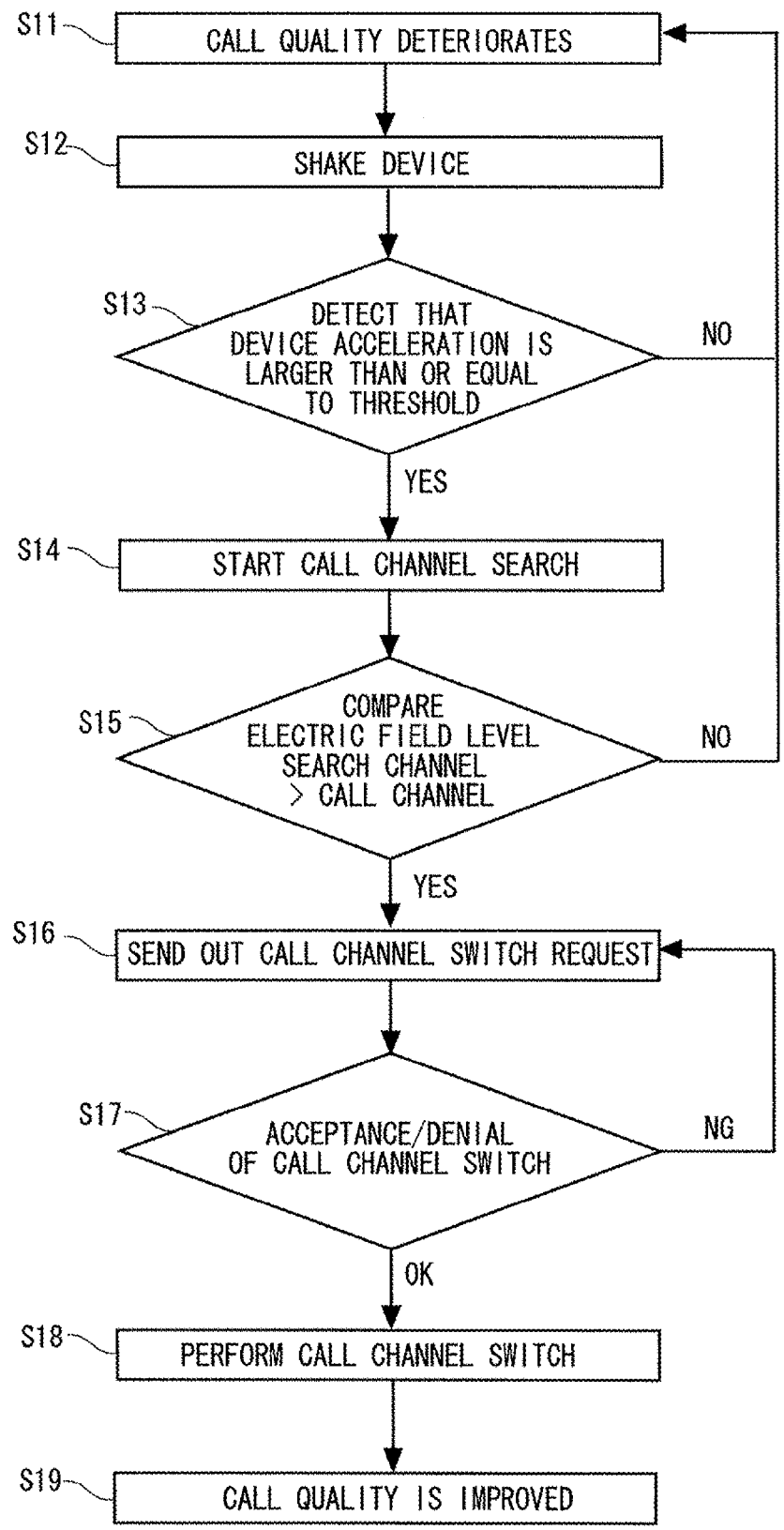
FIG. 4 is a flowchart showing an operation example when a mobile phone device according to an exemplary embodiment of the present invention is engaged in a call.
Figure 5:
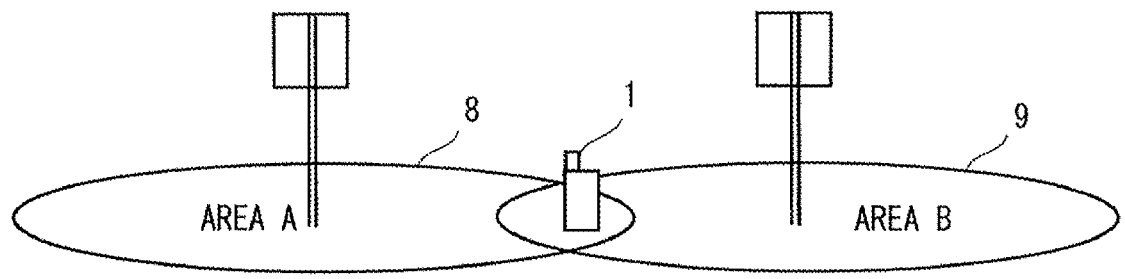
FIG. 5 shows a concept of service areas of a mobile phone device according to an exemplary embodiment of the present invention.
Figure 6:
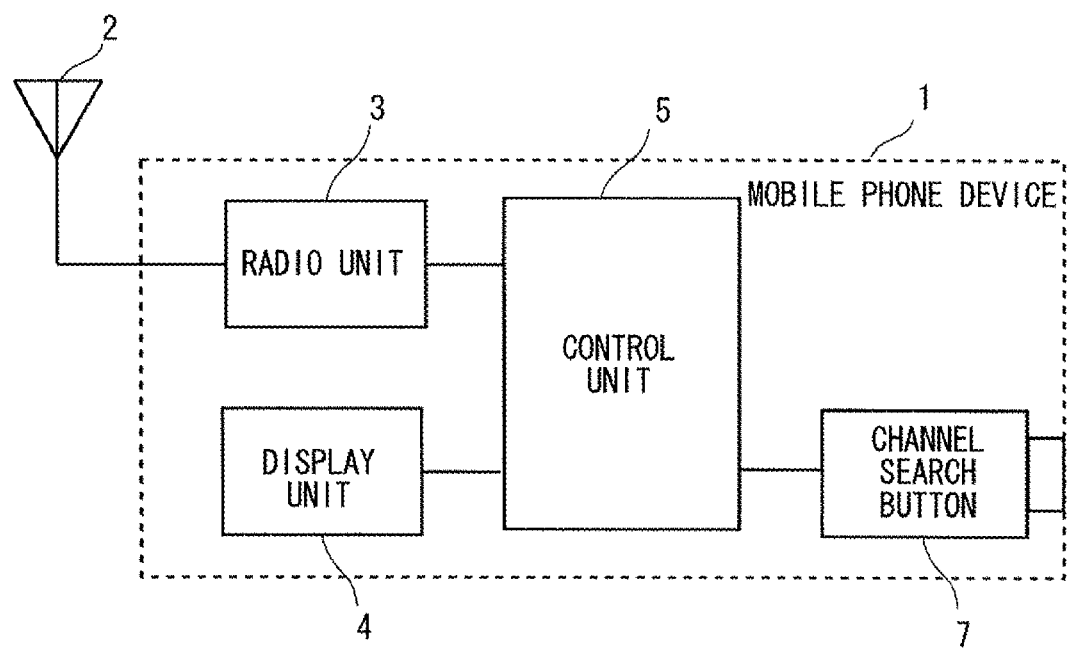
FIG. 6 is a block diagram illustrating a configuration of a substantial part of a mobile phone device in relation to the present invention.

1 MOBILE PHONE DEVICE
2 TRANSMITTING/RECEIVING ANTENNA
3 RADIO UNIT
4 DISPLAY UNIT
5 CONTROL UNIT
6 ACCELERATION SENSOR
7 CHANNEL SEARCH BUTTON
8 AREA A
9 AREA B

The invention claimed is:

1. A mobile phone device comprising:
a controller that performs control so as to start a channel search by using a predetermined amount of vibration exerted on the mobile phone device as a trigger; and
an acceleration sensor that detects an amount of vibration exerted on the mobile phone device,
wherein the controller compares an amount of vibration detected by the acceleration sensor with a redetermined first threshold and when the amount of vibration is higher than or equal to the first threshold starts to measure electric field levels of waiting channels as the channel search,
wherein the controller compares an electric field level of a waiting channel having a highest electric field level among the measured waiting channels with a predetermined second threshold, and when the electric field level of the waiting channel having the highest electric field level is higher than the second threshold, sends out a position registration request.

2. The mobile phone device according to claim 1, wherein when the electric field level of the waiting channel having the highest electric field level is lower than or equal to the second threshold, the controller maintains waiting in a current channel.

3. The mobile phone device according to claim 1, wherein when the sent position registration request is not accepted on a communication network side, the controller turns off indication indicating out-of-service.

4. A mobile phone device comprising:
a controller that performs control so as to start a channel search by using a predetermined amount of vibration exerted on the mobile phone device as a trigger; and
an acceleration sensor that detects an amount of vibration exerted on the mobile phone device,
wherein the controller compares an amount of vibration detected by the acceleration sensor with a redetermined first threshold and when the amount of vibration is higher than or equal to the first threshold starts to measure electric field levels of call channels as the channel search,
wherein the controller compares an electric field level of a call channel having a highest electric field level among the measured call channels with an electric field level of a current call channel, and when the measurement was electric field level of the call channel having the highest electric field level is higher than the electric field level of the current call channel, sends out a call channel switch request.

5. The mobile phone device according to claim 4, wherein when the electric field level of the call channel having the highest electric field level is lower than or equal to the electric field level of the current call channel, the controller maintains communication through the current call channel.

6. The mobile phone device according to claim 4, wherein when the sent call channel switch request is accepted on a communication network side, the controller performs switching of call channels.

7. A channel search method for a mobile phone device comprising:
detecting an amount of vibration exerted on the mobile phone device;
comparing the amount of vibration with a predetermined first threshold;
starting, when the amount of vibration is higher than or equal to the first threshold, to measure electric field levels of waiting channels as a channel search;
comparing an electric field level of a waiting channel having a highest electric field level among the measured waiting channels with a predetermined second threshold; and
sending out, when the electric field level of the waiting channel having the highest electric field level is higher than the second threshold, a position registration request.

8. A channel search method for a mobile phone device comprising:
detecting an amount of vibration exerted on the mobile phone device;
comparing the amount of vibration with a predetermined first threshold;
starting, when the amount of vibration is higher than or equal to the first threshold, to measure electric field levels of call channels as a channel search;

comparing an electric field level of a call channel having a highest electric field level among the measured call channels with an electric field level of a current call channel; and sending out, when the electric field level of the call channel having the highest electric field level is higher than the electric field level of the current call channel, a call channel switch request.

9. A non-transitory storage medium that stores a program for causing a computer to execute:

a process for detecting an amount of vibration exerted on the mobile phone device;

a process for comparing the amount of vibration with a predetermined first threshold;

a process for, when the amount of vibration is higher than or equal to the first threshold, starting to measure electric field levels of waiting channels as a channel search;

a process for comparing an electric field level of a waiting channel having a highest electric field level among the measured waiting channels with a predetermined second threshold, and a process for when the electric field level of the waiting channel having the highest electric field level is higher than the second threshold, sending out a position registration request.

10. A non-transitory storage medium that stores a program for causing a computer to execute:

a process for detecting an amount of vibration exerted on the mobile phone device;

a process for comparing the amount of vibration with a predetermined first threshold;

a process for, when the amount of vibration is higher than or equal to the first threshold, starting to measure electric field levels of call channels as a channel search;

a process for comparing an electric field level of a call channel having a highest electric field level among the measured call channels with an electric field level of a current call channel; and a process for, when the electric field level of the call channel having the highest electric field level is higher than the electric field level of the current call channel, sending out a call channel switch request.

* * * * *